(12) United States Patent
Chou

(10) Patent No.: US 6,954,008 B2
(45) Date of Patent: Oct. 11, 2005

(54) INTEGRATED POWER SUPPLY APPARATUS FOR INFORMATION APPLIANCES

(75) Inventor: Chin-Wen Chou, Hsin-Tien (TW)

(73) Assignee: Zippy Technology Corp., Taipei Hsien (TW)

( * ) Notice: Subject to any disclaimer, the term of this patent is extended or adjusted under 35 U.S.C. 154(b) by 142 days.

(21) Appl. No.: 10/444,969

(22) Filed: May 27, 2003

(65) Prior Publication Data

US 2004/0240242 A1 Dec. 2, 2004

(51) Int. Cl.⁷ .................................................. H02J 3/02

(52) U.S. Cl. ........................... 307/26; 315/210; 363/37; 363/61

(58) Field of Search ............................... 363/37, 59, 61; 323/266, 267; 307/26, 82; 315/247, 307, 210, 312

(56) References Cited

U.S. PATENT DOCUMENTS

| | | | | | |
|---|---|---|---|---|---|
| 5,956,243 | A | * | 9/1999 | Mao | 363/61 |
| 5,994,795 | A | * | 11/1999 | Gabillet | 307/82 |
| 5,998,930 | A | * | 12/1999 | Upadhyay et al. | 315/247 |

\* cited by examiner

*Primary Examiner*—Jessica Han
(74) *Attorney, Agent, or Firm*—Birch, Stewart, Kolasch & Birch, LLP

(57) ABSTRACT

An integrated power supply apparatus for information appliances includes a power supply input unit, a rectification unit and a voltage boosting unit. The previous design of transforming low voltage to high voltage through a voltage boosting unit (inverter) is changed to transforming to medium voltage through the rectification unit then is transformed to high voltage through the voltage boosting unit. Therefore loss on the low voltage power supply is eliminated, and performance may increase from 64% to about 80% or more. Thus the low voltage power supply module that otherwise should have extra power and greater watts may be shrunk and power supply efficiency may increase.

10 Claims, 7 Drawing Sheets

INTEGRATED POWER SUPPLY APPARATUS FOR INFORMATION APPLIANCES

FIELD OF THE INVENTION

The present invention relates to an integrated power supply apparatus for information appliances and particularly to a power supply apparatus for reducing power supply loss to information appliances and improving performance.

BACKGROUND OF THE INVENTION

At present many information appliance products such as plasma TV and liquid crystal display, aside from various electronic circuits, have a power supply device to support the information appliances. The power supply device generally provides only low voltage electric power. Refer to FIG. 1 for a conventional power supply for the back light panel of a liquid crystal display. The back light panel includes cold cathode fluorescent lamps (CCFLs) that require a high voltage (as high as hundred or even thousand volts) to activate.

Namely, input alternating current (AC) voltage is transformed by a medium voltage rectification unit to become medium voltage direct current (DC) to be output. And the medium voltage DC is further transformed by a conversion unit to become low voltage DC to be output. The low voltage DC is processed by a voltage boosting unit (inverter) to output high voltage AC. The high voltage AC may drive the CCFLs. The efficiency of the voltage boosting unit is 80%. When the conversion unit at the previous stage also has efficiency of 80%, total efficiency (the voltage delivered to the CCFLs) is 80%×80%=64%.

As a large size liquid crystal display could use up to 20 lamp tubes, and each lamp tube has energy loss of 5W–10W, total energy loss could reach 36W to 72W. Thus the power supply device for the information appliances incurs a lot of power loss. Performance also cannot be improved.

SUMMARY OF THE INVENTION

The primary object of the invention is to resolve the aforesaid disadvantages and eliminate the drawbacks of the prior art. The power supply apparatus for information appliances of the invention eliminates the loss occurred to the low voltage power supply, thus can reduce power loss of power supply and improve performance.

To achieve the foregoing object, the integrated power supply apparatus for information appliances of the invention includes a power supply input unit, a rectification unit and a voltage boosting unit. The power supply input unit delivers an AC voltage to the rectification unit which rectifies and outputs medium voltage DC. The medium voltage DC is processed by the voltage boosting unit to obtain high voltage AC. Thus power supply loss occurs only to the voltage boosting unit, and total power loss can be reduced and performance may be improved.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
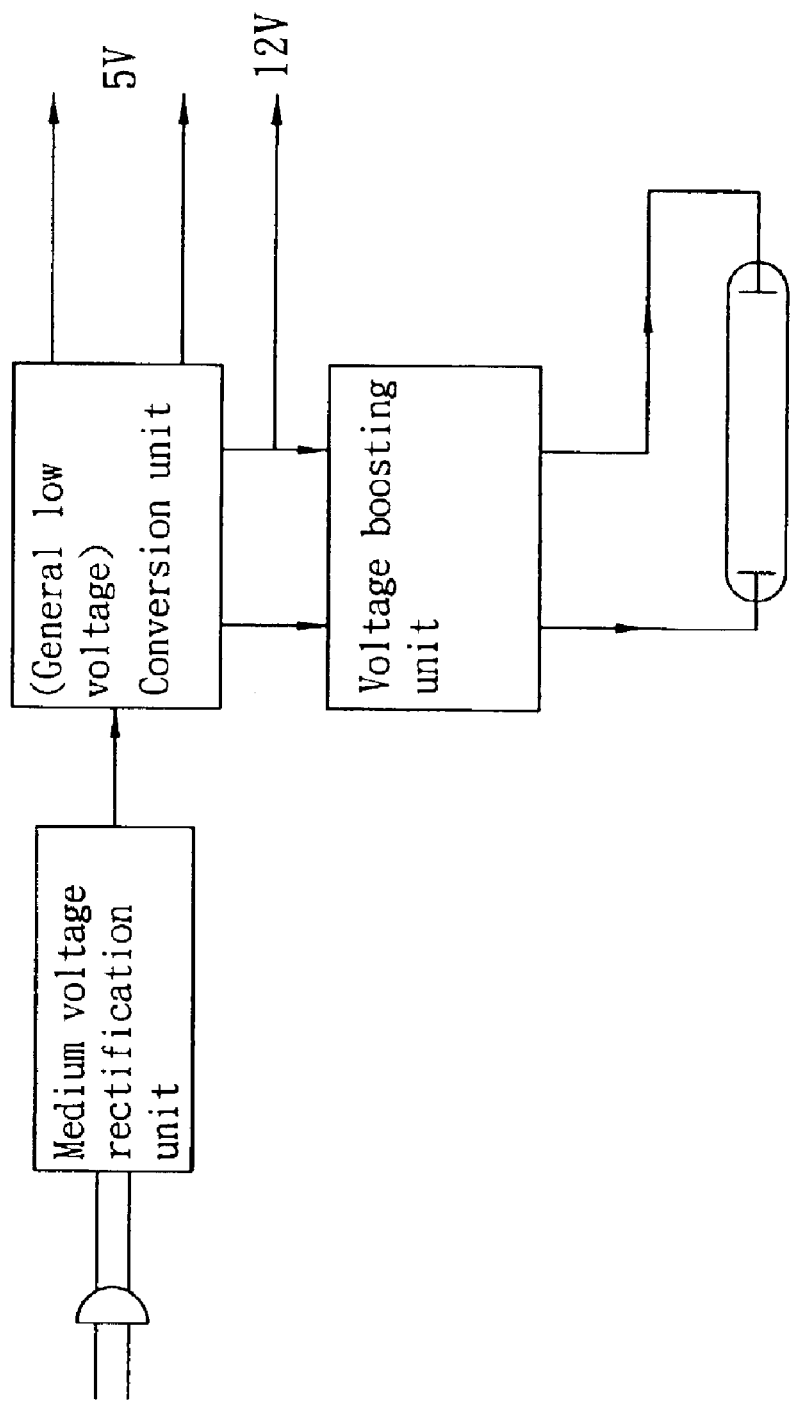
FIG. 1 is a circuit block diagram of a conventional power supply apparatus for information appliances.
Figure 2:
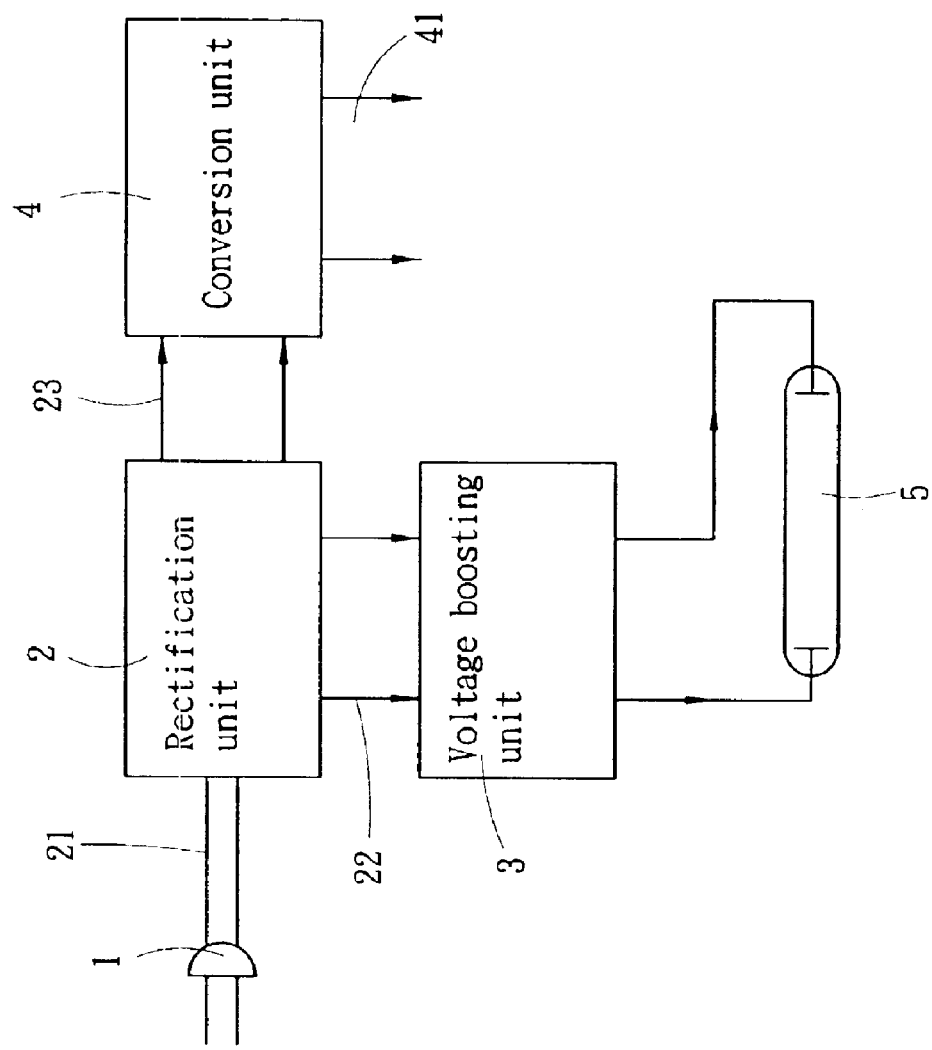
FIG. 2 is a circuit block diagram of the integrated power supply apparatus of the present invention.

Please refer to FIG. 2 for the circuit block diagram of the integrated power supply apparatus of the present invention. As shown in the figure, the integrated power supply apparatus of the invention includes a power supply input unit 1, a rectification unit 2, a voltage boosting unit 3, a conversion unit 4 and a load 5. The rectification unit 2 directly outputs medium voltage power supply to the voltage boosting unit 3. Hence power loss occurs only to the voltage boosting unit 3. As a result, total power loss can be reduced and performance may be improved In the structure of the invention set forth above, the power supply input unit 1 provides AC voltage of 110–220V.

The rectification unit 2 has an input end 21 to receive input from the AC power supply. The rectification unit 2 rectifies the AC power supply to become a medium voltage DC in a range about 150 DCV and 300 DCV to be output. The rectified DC voltage is output through a first output end 22 and a second output end 23.

The voltage boosting unit 3 has a great power (watts) and includes an inverter with total performance at about 80%. The voltage boosting unit 3 has an input end connecting to the first output end 22 of the rectification unit 2 to transform the DC voltage output from the rectification unit to become a high voltage AC for outputting.

The conversion unit 4 is connected to the second output end 23 of the rectification unit 2 to transform the medium voltage DC output from the rectification unit 2 to a low voltage (such as 5V, +/−12V, +/−24V, etc.) DC 41 output to supply other circuits that require low voltage DC.

The load 5 may be, but not limited to CCFLs, ozone generators, or negative ions generators. The load 5 is connected to the output end of the voltage boosting unit 3 and driven by the high voltage output from the voltage boosting unit 3.

When the power supply input unit 1 delivers AC power supply input to the rectification unit 2, the rectification unit 2 rectifies the AC power supply to a medium voltage DC power supply (150DCV –300DCV) to be output. The medium voltage DC is output respectively to the voltage boosting unit 3 and the conversion unit 4. The voltage boosting unit 3 transforms the medium voltage DC output from the rectification unit 2 to high voltage AC about 500VAC–1000VAC to be output. The voltage may be used to drive the load 5 connected to the voltage boosting unit 3.

As the voltage boosting unit (inverter) 3 that transforms the original low voltage to high voltage is designed to boost the medium voltage DC that has been rectified by the rectification unit 2 to high voltage, thus loss that would otherwise occur to the low voltage power supply is eliminated. Performance can increase from 64% to about 80% or more due to loss occurs only to the voltage boosting unit 3. The original low voltage power supply module that should have been designed for providing extra power and more watts can be shrunk. Shrinking of the power supply module further improves the performance.

Figure 3:
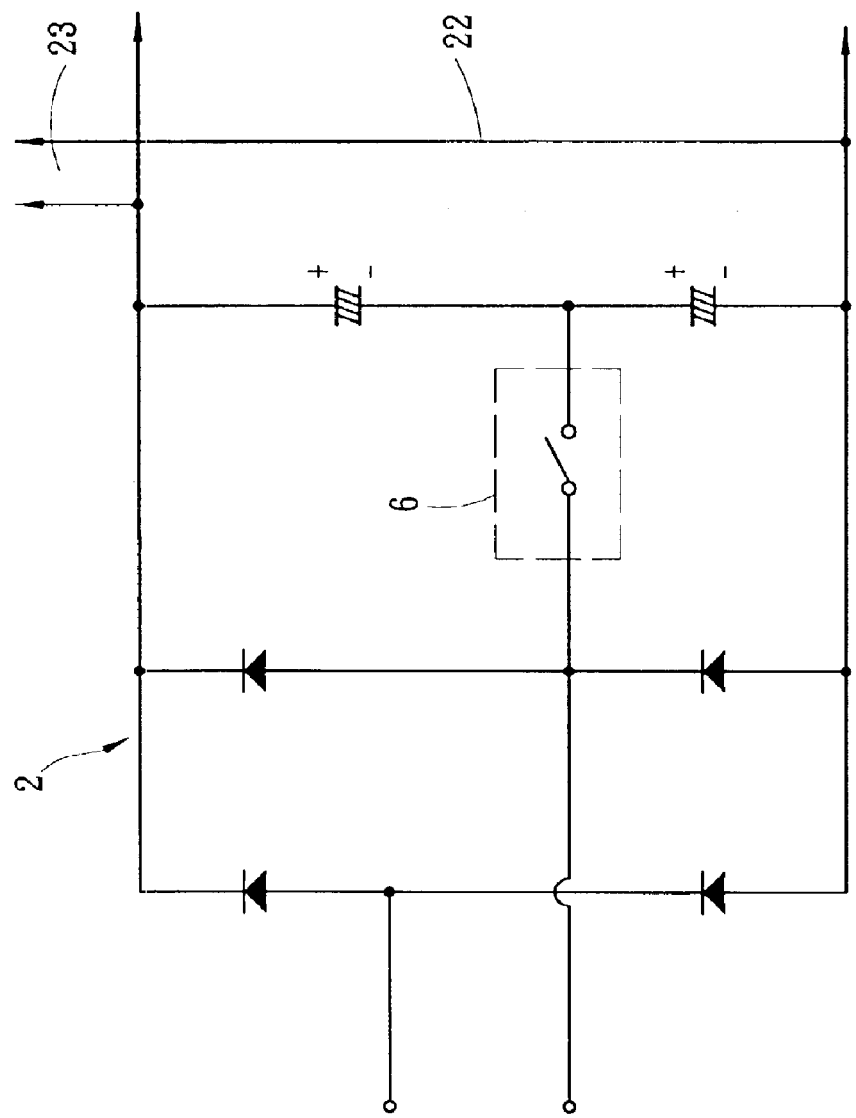
FIG.3 is a circuit diagram of another embodiment of the present invention.

Refer to FIG. 3 for another embodiment of the invention. The integrated power supply apparatus for information appliances of the invention employs a rectification unit 2 which rectifies AC voltage to medium voltage DC for outputting. The rectification unit 2 may be a half-wave bridge rectification or a full-wave bridge rectification, or adopt a regulated voltage approach to transform AC voltage to a medium voltage DC for outputting.

In the mean time, the half-wave bridge rectification or the full-wave bridge rectification is bridged by a switch unit 6 which may be a mechanical type or an electronic type. When the rectification unit 2 is the half-wave bridge rectification or the full-wave bridge rectification, the switch unit 6 provides the switch function.

Figure 4:
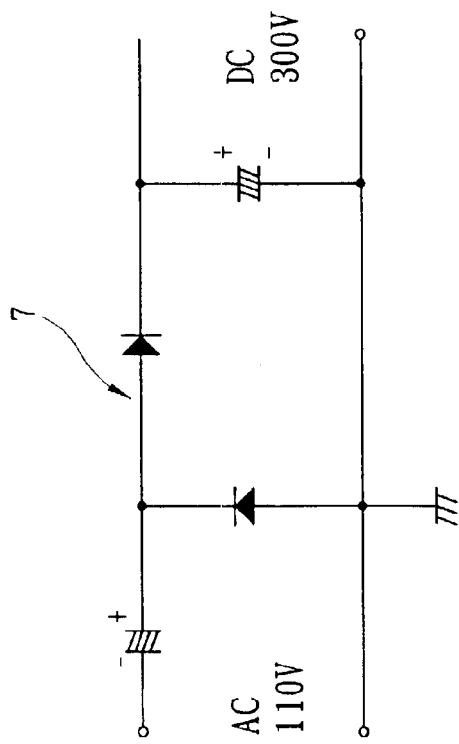
FIG.4 is a circuit diagram of yet another embodiment of the present invention.

Refer to FIG. 4 for yet another embodiment of the invention. The integrated power supply apparatus for information appliances of the invention employs a rectification unit 2 which includes a half-wave or full-wave voltage doubling unit 7 that consists of at least one capacitor and diode to double the input AC voltage to become a medium voltage DC for outputting.

Figure 5:
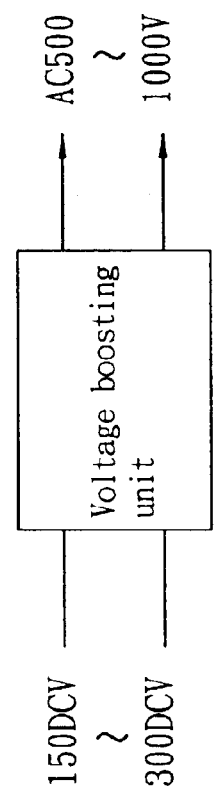
FIG. 5 is a circuit diagram of still another embodiment of the present invention.

Refer to FIG. 5 for still another embodiment of the invention. The voltage boosting unit 3 used in the integrated power supply apparatus for information appliances of the invention may be a conventional coil type (non-resonant pulse width modulation—PWM) or coil resonant type, or a piezoelectric ceramic transformer to transform medium voltage DC to high voltage AC for outputting.

Figure 6:
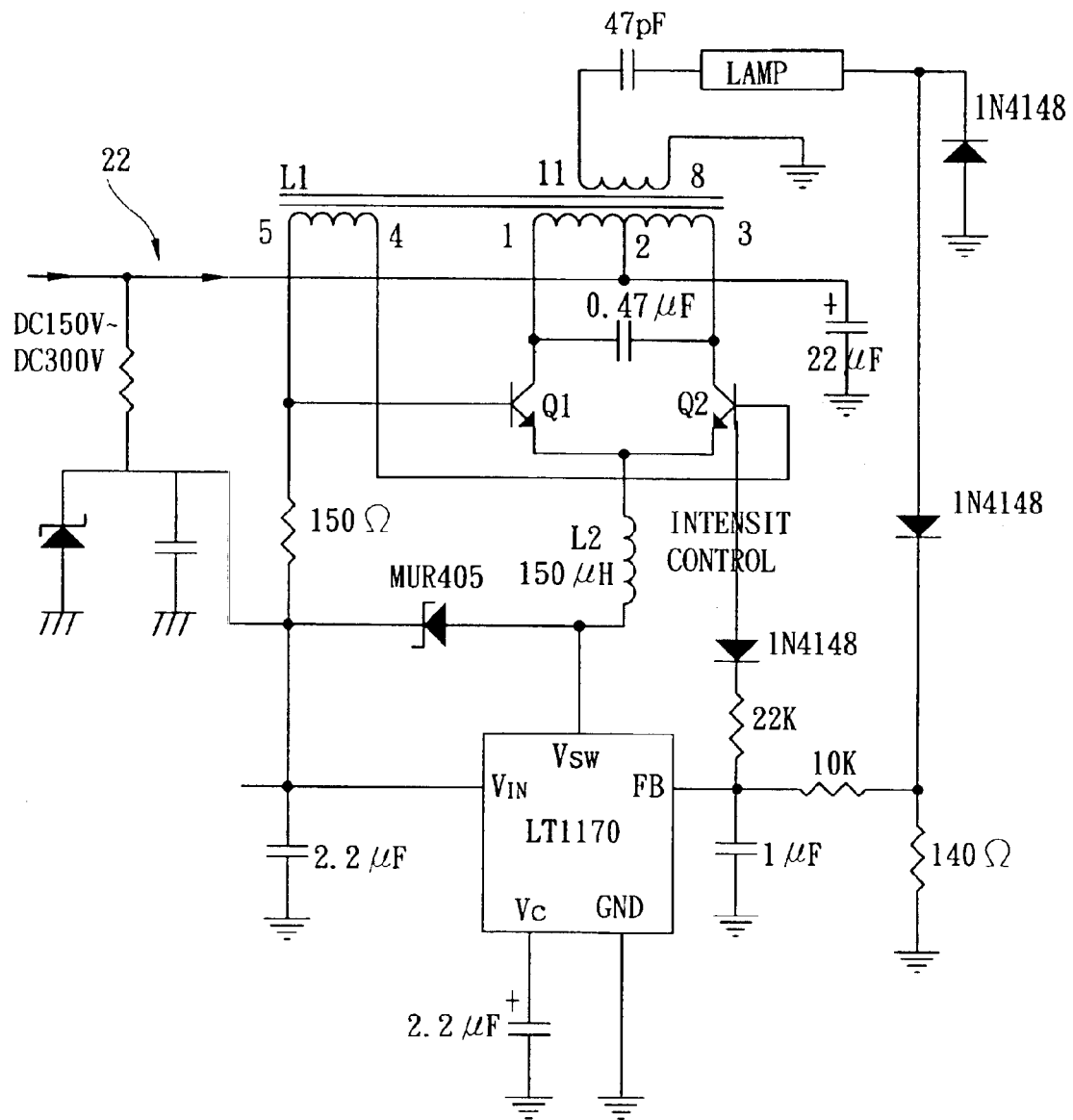
FIGS. 6, 7 and 8 are circuit diagrams of the invention that have medium voltage DC applying on conventional CCFL driving devices.
Figure 7:
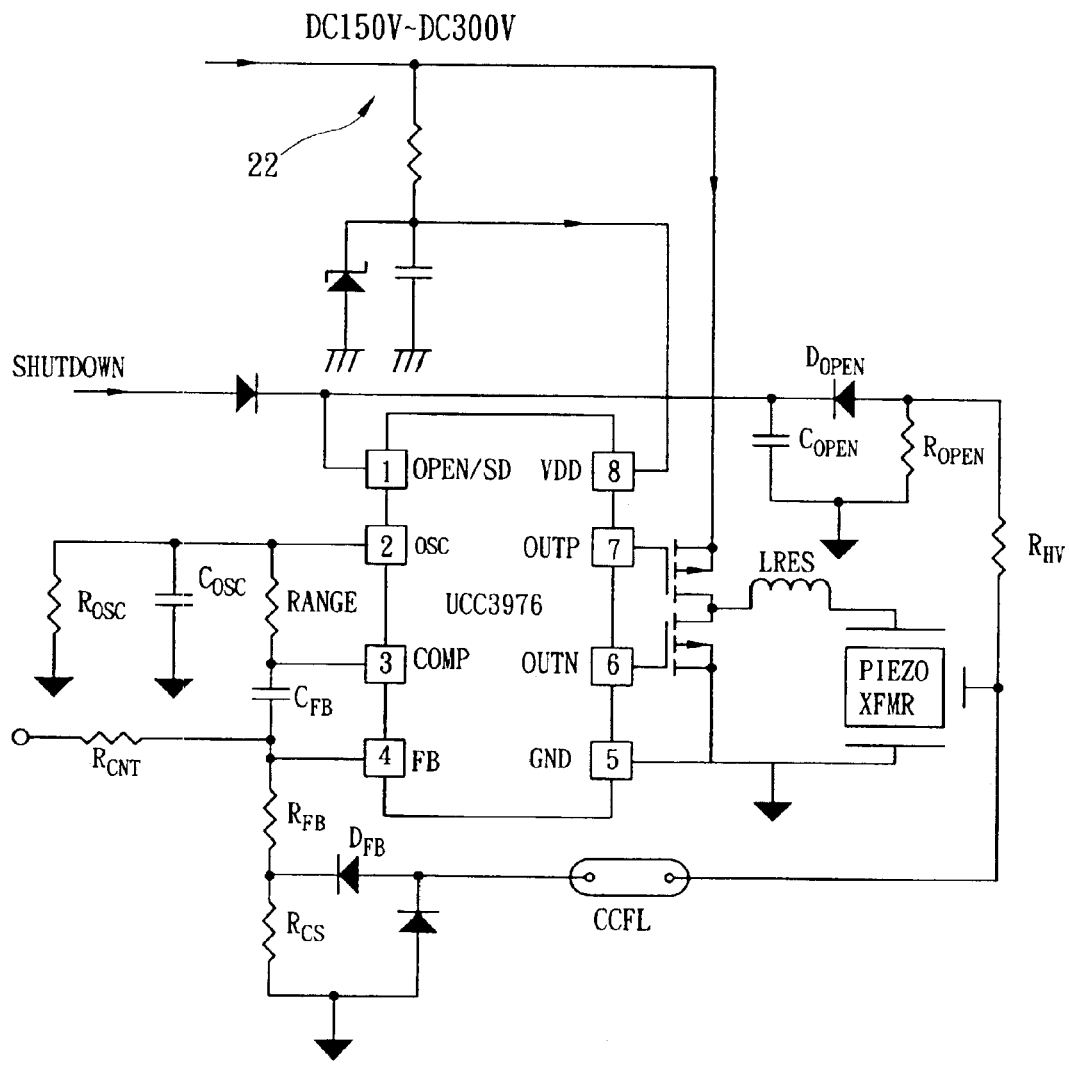
Figure 8:
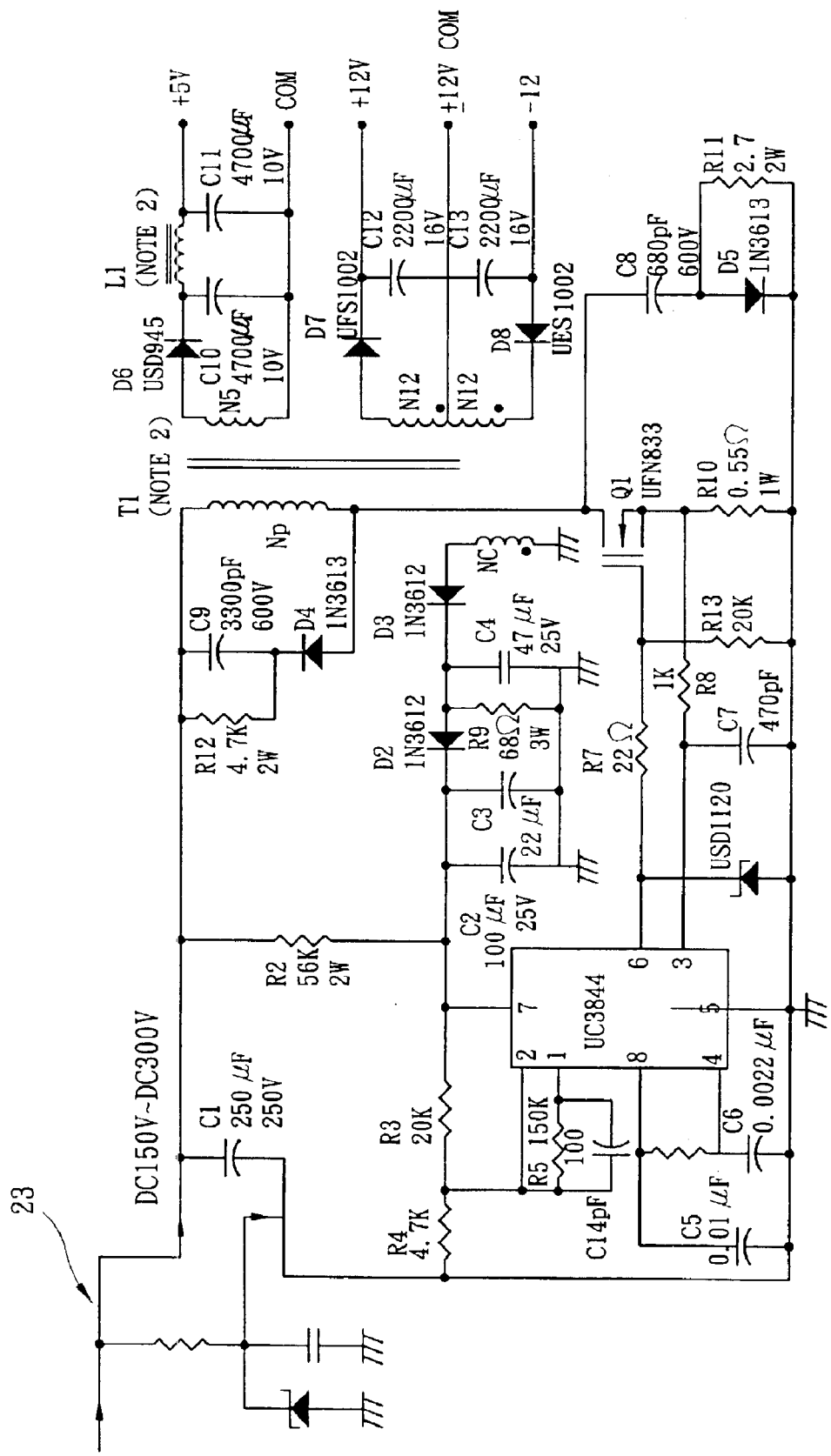

Refer to FIGS. 6, 7 and 8 for embodiments of the invention in use. The rectification unit 2 rectifies AC voltage to medium voltage DC for outputting. The medium voltage DC output may be directly connected to a CCFL driving device which may be a conventional coil or a high voltage AC inverter. Then the conventional CCFL driving device can reduce power loss and performance may increase.

Moreover, the conversion unit 4 used in the invention may be multiple sets, a single set, or a positive and negative power supply type.

While the preferred embodiments of the invention have been set forth for the purpose of disclosure, modifications of the disclosed embodiments of the invention as well as other embodiments thereof may occur to those skilled in the art. Accordingly, the appended claims are tended to cover all embodiments which do not depart from the spirit and scope of the invention.

What is claimed is:

1. An integrated power supply apparatus for information appliances to rectify and output medium direct current voltage, comprising:

a power supply input unit to input an alternating current voltage;

a rectification unit connected to an input end of the power supply input unit for rectifying the alternating current voltage to a medium direct current voltage to be outputted, the rectification unit having a half-wave or a full-wave voltage doubling unit including at least one capacitor and a diode to double-input the alternating current voltage to the medium direct current voltage for outputting; and a voltage boosting unit connected to the rectification unit for transforming the medium direct current voltage to a high voltage for outputting such that power loss occurs only to the voltage boosting unit thereby to reduce power supply loss of the information appliances and improve performance.

2. The integrated power supply apparatus of claim 1, wherein the medium direct current voltage ranges from 150 DCV to 300 DCV and the high voltage outputted by the voltage boosting unit ranges from 500V AC to 1000V AC.

3. The integrated power supply apparatus of claim 1, wherein the rectification unit is a half-wave bridge rectification, a full-wave bridge rectification or a regulated voltage rectification.

4. The integrated power supply apparatus of claim 3, wherein the half-wave bridge rectification or the full-wave bridge rectification is bridged by a switch unit.

5. The integrated power supply apparatus of claim 4, wherein the switch unit is a mechanical type or an electronic type.

6. The integrated power supply apparatus of claim 1, wherein the voltage boosting unit is a (non-resonant pulse width modulation) coil type, a coil resonant type, or a piezoelectric ceramic transformer.

7. The integrated power supply apparatus of claim 1 further having a conversion unit for transforming the medium direct current voltage to a low voltage for outputting.

8. The integrated power supply apparatus of claim 7, wherein the conversion unit is in the form of multiple sets, a single set, or a positive and negative power supply.

9. The integrated power supply apparatus of claim 1 further having a load.

10. The integrated power supply apparatus of claim 9, wherein the load is a cold cathode fluorescent lamp, an ozone generator, or a negative ions generator.

* * * * *